United States Patent [19]
Donohoe

[11] Patent Number: 5,521,658
[45] Date of Patent: May 28, 1996

[54] OPTICAL ASPECT RATIO CONTROL FOR VIDEO PROJECTION

[76] Inventor: Vincent Donohoe, 64 Glebe Place, London, United Kingdom, SW3 5JB

[21] Appl. No.: 271,955

[22] Filed: Jul. 8, 1994

[51] Int. Cl.$^6$ ................................................. G03B 21/28
[52] U.S. Cl. .................... 353/98; 353/69; 348/445
[58] Field of Search ........................... 353/98, 69, 79; 348/173, 445, 771, 770, 764, 755, 782, 746, 747

[56] References Cited

U.S. PATENT DOCUMENTS

| | | | |
|---|---|---|---|
| 5,136,398 | 8/1992 | Rodriguez-Cavazos et al. | 348/445 |
| 5,280,540 | 1/1994 | Addeo et al. | 348/445 |
| 5,386,236 | 1/1995 | Hong | 348/445 |
| 5,386,252 | 1/1995 | Oku | 348/746 |
| 5,428,454 | 6/1995 | Kimura et al. | 348/445 |

FOREIGN PATENT DOCUMENTS 5053197  3/1993  Japan ........................... 353/69

*Primary Examiner*—William C. Dowling
*Attorney, Agent, or Firm*—J. E. McTaggart

[57] ABSTRACT

An optional beam aspect control device enables a video projection system designed for standard aspect ratio (e.g. 4:3), to operate from widescreen-formatted video source material and to project an image with a wide aspect ratio (e.g. 16/9), without loss of picture information or resolution capability and with no risk of source screen burnin due to blank top and bottom regions. A reflector, introduced in the video light beam between the projector and the viewing screen, can be curved in one axis, either manually or by a controllable electric mechanism. The reflector is typically kept flat for operation at the standard aspect ratio (4:3) and then controllably curved to display images in non-standard aspect ratios. The source image outline is always kept optimally registered on the source screen for full screen utilization with no blank top and bottom regions; consequently, when the system operates in a non-standard aspect ratio mode, the source image is forced to operate at an offset aspect ratio. This offset is subsequently corrected optically. Thus in a widescreen mode the source image is compressed horizontally and the projected image, held at full height, is widened optically to the correct size. Optimal source image/ screen registration for widescreen operation can be accomplished by adjustment of the vertical scan of the source screen or by a video tape transfer format tradeoff that eliminates top and bottom blank regions by introducing aspect ratio offset error.

19 Claims, 3 Drawing Sheets

OPTICAL ASPECT RATIO CONTROL FOR VIDEO PROJECTION

FIELD OF THE INVENTION

The present invention relates to video reproduction and more particularly it relates to methods and apparatus for acting on a projected video light beam in a manner to alter the aspect ratio (width/height) of the image projected on a viewing screen. Control of the projected aspect ratio external to the projector enables a conventional video projector with a source screen of designated aspect ratio, e.g. 4:3 standard, to be operated with picture information intended for a different aspect ratio, e.g. 16:9 widescreen, while maintaining the source image optimally registered on the source screen, thus overcoming the degradations inherent in conventional adaptation techniques used heretofore to accommodate non-standard aspect ratio, wherein boundary misregistration results in substantial unused source screen regions and/or loss of picture information.

BACKGROUND OF THE INVENTION

In present day television and video practice, the standard aspect ratio is 4:3, in accordance with EIA standard RS-170 and NTSC color television broadcast standards. However in the motion picture field, many movies have been made in a widescreen mode, typically with a 16:9 aspect ratio. Reproducing widescreen-formatted material on conventional video displays that are designed for the normal 4:3 aspect ratio has be problematic and has led to a number of adaptive compromises, both in film-to-video transfer and in reproduction in video display systems, that often result in loss of picture information, sacrifice of resolution capability and/or display at a grossly wrong aspect ratio, e.g. objectionably compressed horizontally. Thus, to date it remains as an unsolved problem to distribute and reproduce widescreen-formatted visual material satisfactorily on conventional video displays.

With recent developments in large screen video projection there has been a strong emphasis on quality refinements: one of these is the need for a video projection system that can operate optimally in displaying an image in at least a second aspect ratio mode in addition to the standard mode for which it is designed. It is highly desirable that such capability be obtained from a single projector, and for economic purposes it is highly desirable to be able to utilize an existing conventional projector designed for the standard 4:3 aspect ratio, and to enable it to project widescreen images (e.g. 16:9 aspect ratio) when required, without any degradation.

A video projector utilizes some form of image source screen such as a light-emitting phosphor screen of a CRT or an LCD light valve in the path of a beam projected from a light source, from which a source image on the source screen is projected optically onto a viewing screen. The source screen is dimensioned to match the aspect ratio of the source image, as dictated by the format of the video source material, typically the standard 4:3 aspect ratio. The outline of the projected image, being simply magnified optically by the diverging beam, is also displayed at the standard 4:3 aspect ratio.

Normally, registration of the source image on the source screen is controlled by adjusting the horizontal and vertical drive of a scanned raster applied to the source screen (e.g. by electron beam deflection in a CRT). The projector is designed to operate in the normal aspect mode with close outline registration between the raster, the source image and the source screen itself. However, in the usual manner of handling widescreen movies in video media and reproduction, the source image outline is allowed to become misregistered relative to the raster and the source screen, in effect underscanned vertically such that substantial regions of the source screen above and below the image remain unactivated. These blank regions represent loss of resolution capability and cause risk of burnin degradation, and yet any readjustment of the raster scan vertically and/or horizontally to address these problems in projection systems of known art will result in loss of picture information and/or introduce aspect ratio error in the projected image.

FIG. 1A shows the image of a simplified geometric test pattern 12A of standard 4:3 aspect ratio as displayed on a screen 10, e.g. a directly-viewed CRT screen or a projector source screen, of a conventional video display system. In accordance with best practice of known video art the CRT (or source screen) is operated in a manner to locate the produced image optimally registered on the active electro-optical region of screen 10 so as to fully utilize the electro-optical region and to display substantially all of the received picture information.

FIG. 1B illustrates a commonly used mode of adapting a conventional video projection system to display widescreen-formatted source material in a widescreen aspect ratio without loss of received picture information. For this example it is assumed that the original source material, shown here as a special widescreen test pattern, was transferred from film media with a 16:9 aspect ratio videotape media with the standard 4:3 aspect ratio by leaving blank regions 14 above and below the area occupied by the image 12B. Even though these regions 14 of the CRT or projector source screen 10 are raster-scanned in the display device, they are rendered inactive by the video signal being held at a black level.

The widescreen test pattern image 12B is displayed at the correct original aspect ratio 16:9 as evidenced by the correctly round circles, and there is no loss of picture information as evidenced by the completeness of the small circles displayed at each side. However this system has three disadvantages:

(1) There is a loss of vertical resolution capability, 25% in this instance, due to the wasted screen area in regions 16 and the increased pixel density in the central region.

(2) The screen 10 is placed at risk of screen burnin arising from the blanked operation of regions 16. Practically all known electro-optical materials such as CRT phosphors and LCD crystals suffer a gradual loss of efficiency due to electro-optical material fatigue over periods of operation. In the normal mode of FIG. 1A this deterioration tends to be distributed evenly throughout the panel area and thus may remain imperceptible and acceptable since generally it can be compensated for by a simple occasional adjustment of the projector thus extending the source screen's useful life. However prolonged operation as in FIG. 1B tends to "burn in" a permanent difference between the active region of screen 10 and the unused regions 14 that becomes unacceptable when the projector is subsequently operated in the standard mode of FIG. 1A. Burnin in is manifested as the appearance of unwanted borderlines and shadings that cannot be corrected by adjusting the projector, signifying the end of the screen's useful life. Projection systems, where small source screens are operated at extremely high intensity, are particularly susceptible to such burnin deterioration.

(3) In transitioning from standard mode to a widescreen mode, it is subjectively very desireable for the projected image area to actually become larger (i.e. wider); to the contrary, in FIG. 1B the projected image area becomes smaller than in the standard mode (FIG. 1A).

FIG. 1C depicts a mode of widescreen adaptation wherein the outline of screen 10 is in effect overscanned horizontally and underscanned vertically by the source image 12C, thus there is a loss both in vertical resolution capability due to blank regions 16 and in picture information: about 12.5% in each.

FIG. 1D depicts a mode of widescreen adaptation that allows screen 10 to remain fully scanned and activated: the image 12D fills screen 10 vertically, thus, with the correct aspect ratio preserved, about 25% of the original picture information is lost at the sides, as can be seen as loss of about half of the edge circles in the test pattern image 12D.

FIG. 1E illustrates a possible mode of operation wherein the aspect ratio of the widescreen-formatted image 12E has been intentionally offset in order to register image 12E optimally on the screen so that there is no loss of picture information or risk of burnin due to unused regions. The resultant aspect offset error compresses the image horizontally by 25%, distorting the circles to the elliptical shape seen in the test pattern image 12E.

Referring to the modes depicted in FIGS. 1A–E as modes A–E respectively, it is noted that any of modes B–E can be applied in a film-to-video transfer process: mode B is practiced frequently, mode C less frequently, and mode D rarely, while mode E is generally considered unacceptable and thus avoided in the practice of known video art because the large amount of aspect. It ratio error that is apparent in the resultant viewed image is further noted that only modes B and E preserve the full picture information: if modes C or D are applied in the original video production process, the lost picture information can never be recovered in reproduction. Operation in modes B or C, especially over prolonged periods of time, cause risk of burnin due to the blank top and bottom regions of the screen. Thus only mode E preserves full picture information and avoids source screen burnin, however it delivers incorrect aspect ratio, and furthermore there is at present no available widescreen video media formatted in this offset aspect ratio mode.

In general, absent the benefit of the present invention, whenever it is attempted to operate a source screen of a given aspect ratio from source material having a different aspect ratio, video projection systems of known art are subject to one or more of the following degradations: loss of resolution, loss of picture information at the sides, aspect ratio distortion (horizontal compression), and reduced life expectancy of the source screen due to misregistration burn-in.

In theory the aspect ratio of the projected image could be altered optically utilizing specially-shaped transparent lenses; however, these present numerous difficulties and disadvantages such as high cost, optical aberrations, the inability to change the displayed aspect ratio without physically interchanging lenses, and the inability to accomplish continuous variation of the aspect ratio.

OBJECTS OF THE INVENTION

It is the primary object of the present invention to provide an optical device that acts on a light beam from a video projector in a manner to vary the aspect ratio of the projected image.

It is a further object to provide a video projection system, utilizing a video projector of known art, that can operate in at least two modes that differ in aspect ratio, while maintaining the source image fully and optimally registered on the source screen.

It is a further object to provide, in each mode, projected images that are uncompromised with regard to aspect ratio and completeness of displayed picture information.

It is a further object to provide an aspect-mode selection system for projection video that can change modes rapidly and easily between different aspect ratios.

It is a further object to provide continuously variable control of displayed aspect ratio over a predetermined range, while maintaining the outline of the source image optimally registered on the source screen.

SUMMARY OF THE INVENTION

Referring once again to FIG. 1: regarding modes C and D, the unrecoverable loss of picture information makes these modes undesirable. It is recognized that, with an adjustment of the vertical scanning of the CRT (or projector source) screen, commonly available widescreen video media formatted in mode B can be made to produce a source image as in mode E, thus overcoming all of the abovementioned problems of prior art but creating the new problem of aspect ratio error. The present invention, addressing conventional video projection systems that normally operate in standard mode A, provides widescreen capability from a conventional projector by providing for the source screen to operate in mode E with the aspect ratio intentionally offset to optimize source image registration on the source screen, and then correcting the aspect ratio optically external to the projector, by reflection of the optical video beam from a curved reflective surface so that the projected image appears with correct aspect ratio, as in FIG. 1B.

BRIEF DESCRIPTION OF THE DRAWINGS

The above and further objects, features and advantages of the present invention will be more fully understood from the following description taken with the accompanying drawings in which.

DETAILED DESCRIPTION

FIGS. 1A–1E have been discussed above in connection with the shortcomings and disadvantages of known widescreen video art.

Figure 1A:
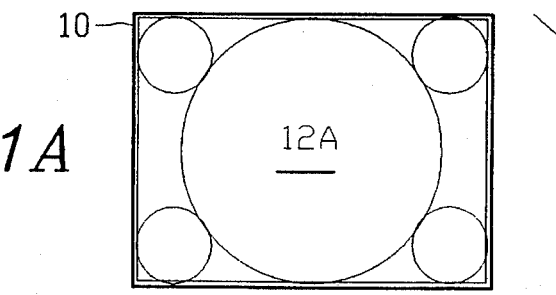
FIG. 1A shows a simplified test pattern illustrating conventional video display operation at standard aspect ratio.
Figure 1B:
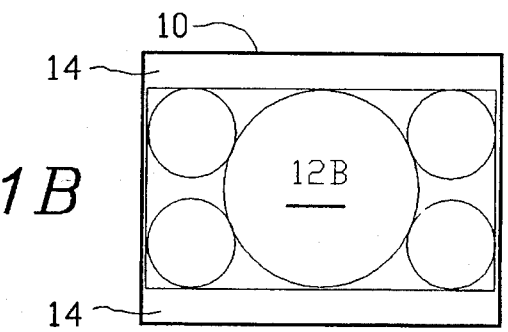
FIGS. 1B–D depict adaptive modes of operation of known art that are commonly utilized in adapting a conventional video system to display widescreen images.
Figure 1C:
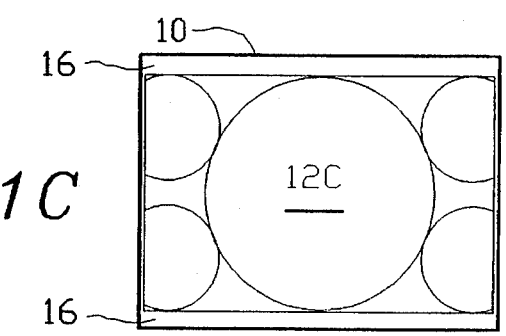
Figure 1D:
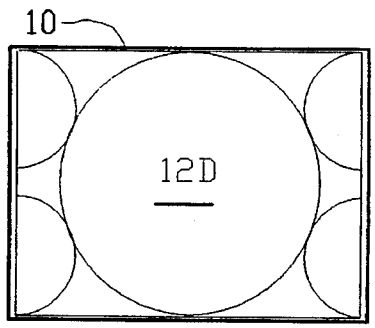
Figure 1E:
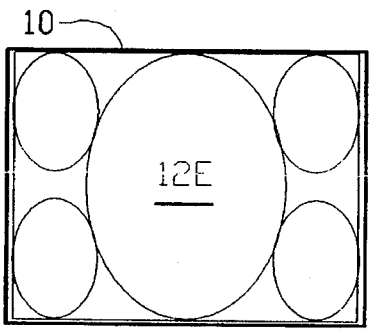
FIG. 1E depicts an offset-aspect-ratio mode of optimally registering a widescreen-sourced video image on a standard aspect ratio screen.
Figure 2A:
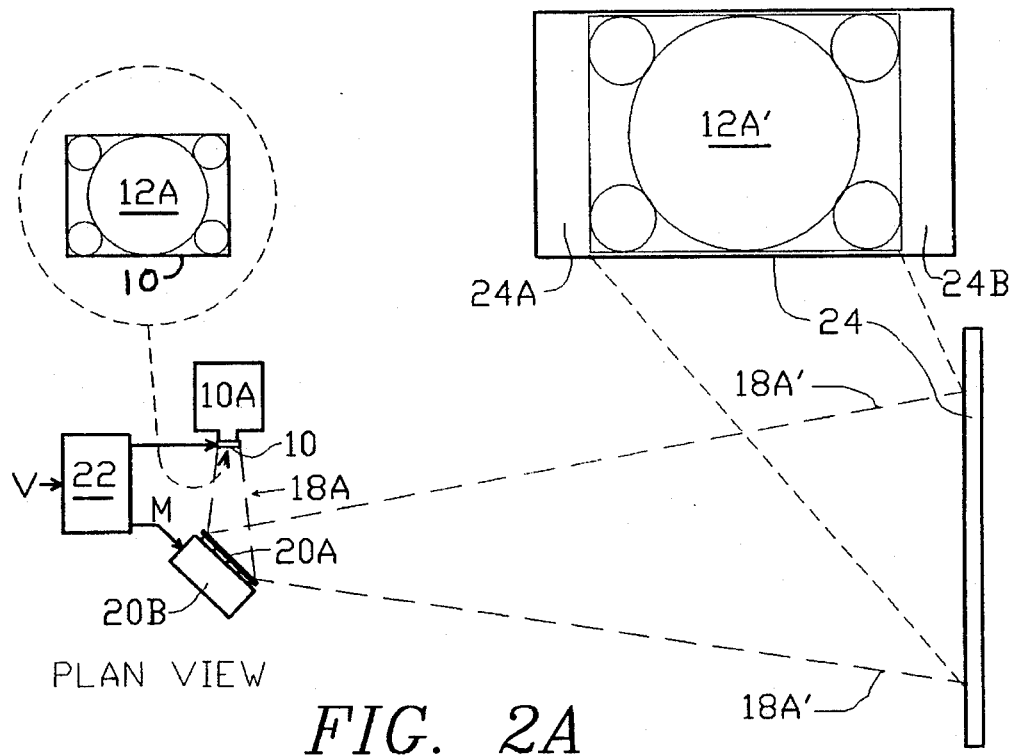
FIG. 2A is a plan view of a simplified functional diagram of a video projection system according to a first embodiment of the present invention operating in a normal aspect mode with a flat reflector, showing the source screen image and the projected image on the viewing screen.
Figure 2B:
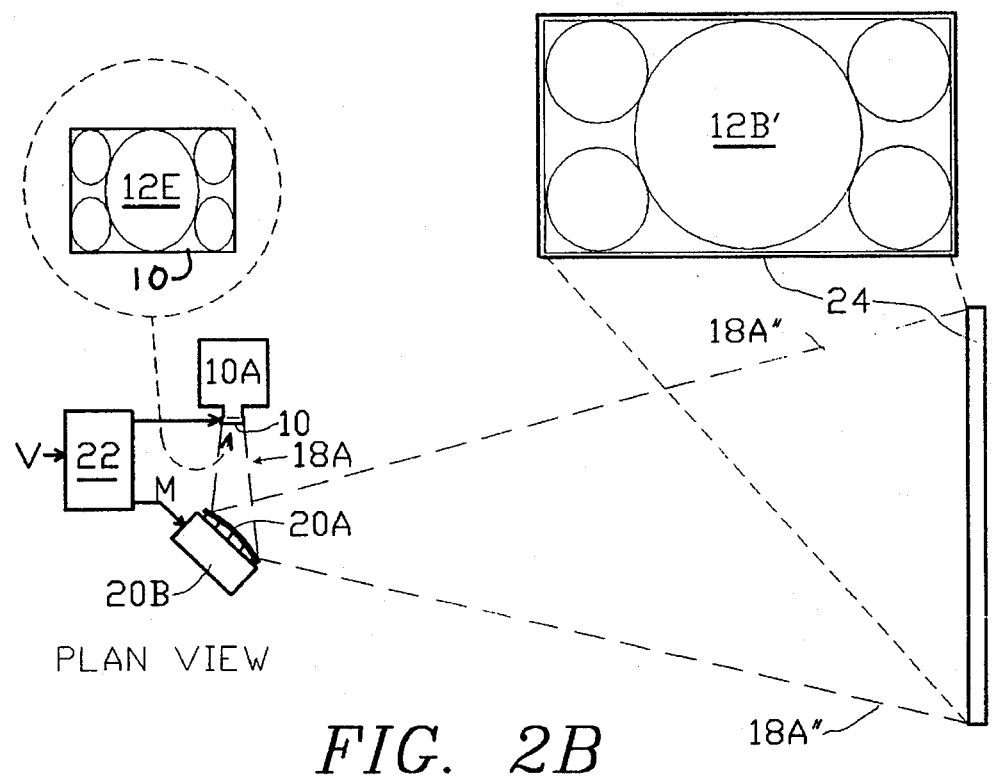
FIG. 2B depicts the subject matter of FIG. 2A operating in a widescreen mode with the reflector curved convexly to correct the aspect ratio by increasing the width of the projected image.

FIGS. 2A and 2B show in plan view a functional diagram of a video projection system in accordance with a preferred embodiment of the present invention that can operate in different aspect modes (i.e. from source video material of different aspect ratios) to provide projected images in correct aspect ratio for each mode while always maintaining the source image optimally registered on the source screen. Aspect ratio correction is applied optically in the light beam between the source screen and the viewing screen by modifying the light beam with a curveable reflector. In this first embodiment, the reflector is made flat for operation at normal aspect ratio and is curved convexly to widen the horizontal deflection angle of the light beam for operation in a widescreen mode.

In FIG. 2A, a video source signal V is input to a display controller 22 driving a source screen 10 of a conventional video projector 10A in a manner of known art: source screen 10 is implemented as an LCD light valve acting on a light beam originating from a small intense light source in projector 10A.

Whereas in conventional projection systems the source screen and viewing screen are typically oriented parallel to each other, screen 24, in this invention source screen 10 is oriented approximately perpendicular to screen. 24, and is in this embodiment oriented vertically, as shown. A reflector 20A is placed at an angle of about 45 degrees relative to panel 10 and to screen 24 as shown to redirect the video image light beam 18A from the source screen 10 to the screen 24 as shown by the dashed outlines 18A'. It will be noted that screen 24 is made with extra width to accommodate wide screen images.

The reflector 20A is inherently flat but made flexible in one plane: it may be made from acrylic plastic, mirror-coated on one side. It may be operationally attached to an electro-mechanical mechanism 20B in a manner that, under control of an aspect mode signal M received from display controller 22, mechanism 20B introduces a variable curvature in one axis of reflector 20A so as to form a cylindrical surface of variable radius as commanded by signal M according the aspect mode required by the particular widescreen format of video signal V.

When the system is required to operate in the normal aspect mode, mechanism 20B is commanded by control signal M (typically zero volts, i.e. no signal default condition) to hold reflector 20A flat: thus the source image 12A will be projected from source screen 10 onto screen 24 where it appears as projected image 12A' with the standard aspect ratio unaltered as shown. The projected image 12A' falls short of the edges of the wide viewing screen 24 as indicated by dashed beam outlines 18A', and leaves unutilized side regions 24A and 24B on screen 24. In this normal aspect mode, the operation of the projection system is generally in accordance with known conventional video projection practice with the exception of the introduction of the flat reflector 20A in the path of the light beam; this requires horizontal scan in the projector in a direction opposite conventional scan absent the reflector.

FIG. 2B depicts the system of FIG. 2A operating in a wide screen mode, e.g. with an aspect ratio of 16:9. The source screen is operated in mode E, preserving optimal registration of image 12E on source screen 20A, with the resultant aspect ratio offset error causing the source image 12E to be horizontally compressed as shown.

Mechanism 20B is commanded, preferably via control signal M, to bend reflector 20A into a convex curved shape as shown, such that the light beam boundaries 18A" are made to diverge sufficiently to widen the projected image 14B' to just fill the entire width of screen 24 as shown, while the height of projected image 12B' remains held at the height of screen 24 since reflector 20A has no effect on the height.

In the wide screen mode, the screen 24 becomes filled by the projected image 12' extending to the full screen outline as shown thus displaying the projected test pattern image 12' in the desired wide aspect ratio, 16:9 in this example.

Figure 3A:
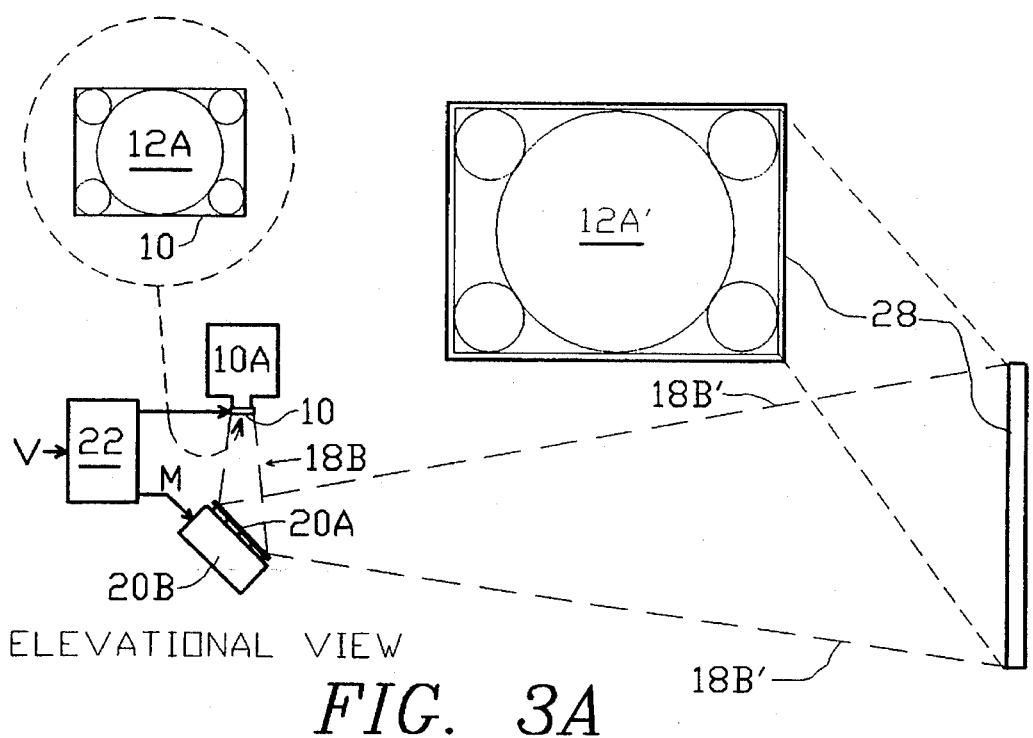
FIG. 3A is an elevational view of a simplified functional diagram of a video projection system according to a second embodiment of the present invention operating in a normal aspect mode with a flat reflector, showing the source screen image and projected image on the viewing screen.
Figure 3B:
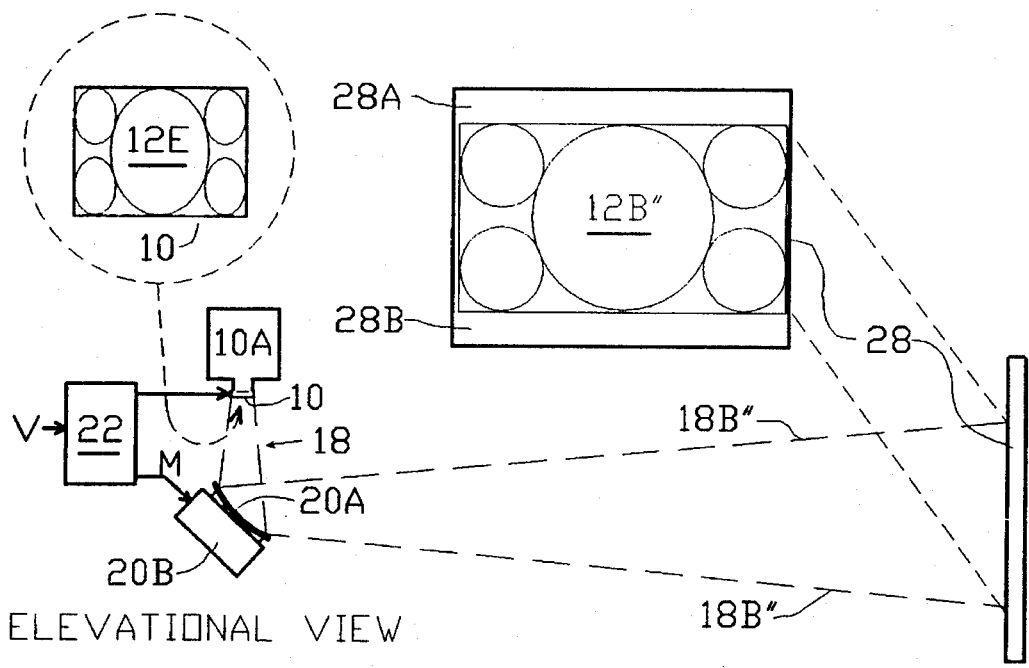
FIG. 3B depicts the subject matter of FIG. 3A operating in a widescreen mode with the reflector curved concavely to correct the aspect ratio by reducing the height of the projected image.

FIGS. 3A and 3B are elevational views (as distinguished from the plan views of FIG. 2A and 2B) of a second embodiment, generally similar to the first embodiment of FIGS. 2A and 2B, but acting on the height of the projected image instead of the width. Thus, in the standard aspect mode, the projected image fills the screen 28, while in a widescreen mode the aspect ratio is corrected by reducing the height of the projected image.

In FIG. 3A, the source screen 10 is oriented in a horizontal plane, and reflector 20A is now oriented as shown. As in FIG. 2A, the flat surface of reflector 20A acts on beam 18B as a simple flat mirror such that the normal 4:3 aspect ratio of the source image 12A on panel 20A is replicated in the projected image 12A' fitted onto the standard aspect screen 28: beam edges 18B' are made to align with the top and bottom edges of screen 28 as shown, so that image 12A' fills screen 28 vertically.

FIG. 3B shows the system of FIG. 3A operating in a widescreen mode: mechanism 20B is commanded by controller 22 via control signal M to bend reflector 20A to a concave shape as shown, causing decrease of vertical deflection in the second portion of the light beam as indicated by the dashed line boundaries 18B" such that screen 28 is now underscanned vertically by image 12B", while remaining fully scanned horizontally, thus providing the correct projected widescreen aspect ratio.

This second embodiment (FIGS. 3A and 3B) is directed primarily to utilization of an existing viewing screen 28 having a standard 4:3 aspect ratio. Where a wide viewing screen is available, the first embodiment shown in FIGS. 2A and 2B is preferred, since subjectively it is highly desirable for the width and area of the projected image to increase when transitioning from the standard mode to the wide screen mode.

The principle of varying the curvature of an optical reflector taught by the present invention may be applied to a variety of different video projection systems over any designated range of aspect ratios.

For illustrative purposes a system has been shown that can provide two different aspect ratios, and as matter of practicality, one of these is made to be the standard 4:3 aspect ratio. Within the scope of the invention, and within the technical capabilities of those skilled in the design of video projection electronics and mechanical structure, the curvature mechanism could be made to provide continuous variation in curvature of the reflector over a predetermined range. Furthermore, it is within the technical capability and skill of those skilled in video signal processing arts, to provide circuitry that can sense the presence and extent of top-bottom-blanking in a video signal formatted for widescreen display, and to convey this information to a control input of aspect ratio correction apparatus taught by the present invention.

As an alternative to automatic control as described, the reflector curvature can be made manually controllable by the viewer via a mechanical mechanism or via manual control of the electro-mechanical reflector-curvature mechanism.

As an alternative to holding the reflector shape flat for one of the modes as described above, the system can be made to operate with a reflector shape within a workable range between a maximum convex shape and a maximum concave shape; for example, a first aspect mode may be provided by setting a convex shape and a second aspect mode provided by setting a concave shape.

Typically curvature introduced in the reflector is shaped as an arc of a circle so that the reflector surface is shaped as a portion of a cylindrical surface; however, with a suitably versatile curvature mechanism, more complex curve shapes can be set up as commanded from the controller, e.g. there could be provided the capability of modifying and adjusting linearity in addition to aspect ratio.

Design of reflector 20A, mechanism 20B and controller 22 (FIGS. 2A, 2B, 3A and 3B) to meet the requirements defined in the present specification is within the competence of those skilled in the electronic and opto-mechanical arts. In mechanism 20B, the electrical drive means can take different forms coupled to the flexible reflector 20A via a suitable linkage, e.g. a motor with a gear box drive or an array of appropriately stopped solenoids each having a core linked to a corresponding point on the rear of the panel.

It is anticipated that the present invention will lead to the availability of widescreen video media, i.e. videotape cassettes and TV broadcasts, especially formatted with the aspect ratio offset according to the present invention so as to eliminate any top and bottom blanking and thus conventional video display equipment will be enabled to handle widescreen material optimally while operating in a normal manner, i.e. with optimal source image/screen registration, without any special readjustment of source screen scanning required for widescreen operation. However identification will be required to distinguish from regular video source material formatted for standard aspect ratio; this can be encoded in the video signal, e.g. in the vertical interval, or in the case of videotape cassettes, the cartridge can be configured with physically or optically sensed identification means.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. An optical beam aspect-control device, interposed in a first portion of an optical video beam emanating along a first axis from a source image on a rectangular source screen of a video projector projecting a rectangular image onto a viewing screen, comprising:

a reflector intercepting the first portion of the video beam and reflecting a second portion thereof in a direction substantially perpendicular to the first portion thereof onto the viewing screen, said reflector being made inherently flat but made flexible along a bending axis thereof; and reflector-shaping means for controllably bending said reflector along the bending axis to a predetermined curvature;

whereby the aspect ratio, defined as width/height, of the projected image may be varied independent of said video projector.

2. The aspect-control device defined in claim 1 wherein the viewing screen is disposed in a substantially vertical plane and wherein a central mean axis of the second portion of the beam is disposed substantially perpendicular to the viewing screen.

3. The aspect-control device defined in claim 2 wherein said reflector-shaping means comprises an electro-mechanical curvature mechanism, operationally attached to said reflector, having capability of bending said reflector to predetermined curvature along the bending axis, said mechanism having a control input and having capability of setting said reflector to any selected one of at least two predetermined different amounts of curvature in accordance with a curvature command applied to the control input.

4. The aspect-control device defined in claim 2 wherein said projector and said reflector are oriented such that the first beam portion and the axis of curvature are made to be substantially horizontal, whereby said reflector-shaping mechanism is enabled to vary the aspect ratio of the projected image by varying the width thereof.

5. The aspect-control device defined in claim 2 wherein said projector and said reflector are oriented such that the first beam portion and the axis of curvature are made to be substantially vertical, whereby said curvature mechanism is enabled to vary the aspect ratio of the projected image by varying the height thereof.

6. The aspect-control device defined in claim 4 further comprising aspect detection means for determining an aspect ratio value required by a received video source signal formatted for widescreen display, and accordingly applying a corrective control signal to the control input of said curvature mechanism commanding the reflector-shaping mechanism to adjust the curvature of the reflector accordingly so as to thus provide the required aspect ratio in the projected image.

7. The aspect-control device defined in claim 1 further comprising:

source screen scanning adjustment means, associated with the projector, for adjusting height of the source image on the source screen in a manner to substantially register the source image on the source screen for operation in a non-standard aspect mode;

whereby the source screen is enabled to operate in an optimally registered manner in the non-standard aspect mode since any associated aspect ratio error at the source screen can be compensated by said aspect-control device such that the projected image is made to have a correct aspect ratio.

8. The video projection system as defined in claim 4 wherein said system is configured to operate in a selected one of two modes:

a standard mode wherein said reflector is made to have zero curvature and the source image and the projected image are made to have an aspect ratio of 4:3; and a widescreen mode wherein the source image is made to have an aspect ratio of 4:3 and the projected image is made to have an aspect ratio of 9:16 as accomplished by increased width of the projected image from beam diverging action of convex curvature of said reflector acting on the projected beam.

9. A video projection system, utilizing a conventional video projector with a rectangular light beam source screen, required to operate in a standard mode providing, on a viewing screen, a projected image having a standard aspect ratio and in at least one widescreen mode providing a projected image having an aspect ratio greater than the standard aspect ratio, comprising:

an inherently flat reflector intercepting a first portion of a light beam emanating from the source screen and reflecting the first portion of the light beam as a second portion thereof directed substantially perpendicular to the first portion thereof, said reflector being made flexible along a designated bending axis; and a reflector-shaping mechanism operationally coupled to said reflector and enabled to introduce a controllable predetermined amount of curvature in said reflector along the bending axis thereof and thus enable control of the projected image with regard to aspect ratio.

10. The video projection system as defined in claim 9, the projector having conventional means for optimal registration of the source image on the source screen when said projection system is operating in the standard mode, further comprising:

registration means for causing the source image to remain substantially registered on the source screen when said projection system is operating in the widescreen mode;

whereby the source screen is enabled to operate in an optimally registered manner in both the standard and the at least one widescreen mode since any associated aspect ratio error at the source screen can be compensated by said aspect-control device such that the projected image is made to have a correct aspect ratio.

11. The video projection system as defined in claim 10 further comprising:

aspect detection means, receiving the source signal and made responsive thereto so as to generate a control signal representing a required aspect ratio; and control input means in said reflector-shaping mechanism receiving the control signal, the mechanism being made to respond thereto by introducing curvature in said mirror to an extent that provides the required aspect ratio, whereby the projected image on said viewing screen is automatically corrected with regard to aspect ratio.

12. The video projection system as defined in claim 9, the projector receiving a special video signal intended for display at a predetermined widescreen aspect ratio wherein the received signal is formatted with and with avoidance of top and bottom blank regions and correspondingly offset aspect ratio, further comprising:

identification means for distinguishing the special video signal from regular video signal formatted for standard aspect ratio; and control means for responding to identification of the special video signal by said identification means by causing said mechanism to adjust the projected image to have the predetermined widescreen aspect ratio.

13. The video projection system as defined in claim 12 wherein said identification means comprises a signal encoded in a vertical interval period of the special video signal.

14. The video projection system as defined in claim 12, wherein the special video signal is received from a videotape cassette, and wherein said identification means comprises a physically distinguishable feature configured in the cassette.

15. The video projection system as defined in claim 12, wherein the special video signal is received from a videotape cassette, and wherein said identification means comprises an optically distinguishable feature configured in the cassette.

16. A method of optically modifying the aspect ratio defined as width/height of a projected video image, in a conventional video projection system having a source screen of standard aspect ratio, receiving a video signal formatted for widescreen display at a non-standard aspect ratio, having a projector defining a first portion of an optical beam and a viewing screen receiving a second portion of the optical video beam and displaying therefrom a projected image, comprising the steps of:

intercepting the first beam portion with a flexible reflector having a substantially planar reflecting surface and oriented so as to redirect the beam to form the second beam portion having a direction substantially perpendicular to the first beam portion;

locating the projector, the reflector and the viewing screen relative to each other such as to cause the second beam portion to reach the viewing screen and thereupon display the projected image; and causing the reflecting surface to become shaped with a curvature that acts upon the beam in a manner to shape the projected image to have the intended aspect ratio.

17. The method of aspect ratio modification as defined in claim 16, wherein the reflector is provided with a bending mechanism having a control input receiving the control signal and made responsive thereto so as to bend the reflector to an amount of curvature commanded by the control signal; comprising the further step of:

deriving a control signal from a video source signal representing an intended aspect ratio that is characteristic of the source signal; and applying the control signal to the control input of the bending mechanism;

whereby the aspect ratio of the projected image is automatically corrected to become the aspect ratio in which the video source signal is intended to be displayed.

18. The method of aspect ratio modification as defined in claim 17 further comprising, for each change in intended aspect ratio, the step of adjusting the source screen with regard to vertical scan so as to hold the source image substantially in outline registration with the source screen;

whereby the source screen is kept fully occupied with picture information and thus operated at maximum resolution capability without loss of picture information or risk of misregistration burnin, such optimal source screen operation being enabled by the capability, provided by said method, of optically modifying the aspect ratio of the projected image.

19. The method of aspect ratio modification as defined in claim 17 further comprising the preliminary step of formatting the video signal in a manner to avoid top and bottom blank regions of the source screen by allowing a corresponding offset error in aspect ratio of the source image;

whereby the source screen is kept fully occupied with picture information without any need for scan readjustment and thus operated optimally at maximum resolution capability without loss of picture information or risk of misregistration burnin, such optimal source screen operation being enabled by the capability, provided by said method of optically modifying the aspect ratio of the projected image to correct for the allowed offset error, thus displaying the projected image in correct aspect ratio.

* * * * *